(12) United States Patent
Oh

(10) Patent No.: US 7,010,325 B1
(45) Date of Patent: Mar. 7, 2006

(54) WIRELESS REPEATER WITH WIRELESS TELEPHONE ADAPTER

(75) Inventor: Dae-Sik Oh, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 531 days.

(21) Appl. No.: 10/167,257

(22) Filed: Jun. 11, 2002

(51) Int. Cl.
H04B 1/38 (2006.01)
(52) U.S. Cl. .................................... 455/557; 455/556.1
(58) Field of Classification Search ............... 455/41.1, 455/41.2, 557, 19, 25, 63, 4, 33.3, 573, 554.2, 455/13.1, 15, 556, 556.1, 14
See application file for complete search history.

(56) References Cited

U.S. PATENT DOCUMENTS

| | | | |
|---|---|---|---|
| 4,056,779 A * | 11/1977 | Toler | .................. 455/11.1 |
| 4,658,096 A | 4/1987 | West et al. | |
| 4,737,975 A | 4/1988 | Shafer | |
| 4,922,517 A | 5/1990 | West et al. | |
| 5,117,450 A | 5/1992 | Jogllekar et al. | |
| 5,261,121 A | 11/1993 | Hashimoto | |
| 5,369,803 A | 11/1994 | Hirasawa et al. | |
| 5,509,028 A | 4/1996 | Marque-Pucheu | |
| 5,526,403 A | 6/1996 | Tam | |
| 5,533,027 A | 7/1996 | Akerberg et al. | |
| 5,574,987 A | 11/1996 | Wallace | |
| 5,715,296 A | 2/1998 | Schornack et al. | |
| 5,805,582 A | 9/1998 | Snelling et al. | |
| 5,812,094 A | 9/1998 | Maldonado | |
| 5,852,421 A | 12/1998 | Maldonado | |
| 5,924,044 A | 7/1999 | Vannatta et al. | |
| 5,946,616 A | 8/1999 | Schornack | |
| 5,953,674 A | 9/1999 | Hutchison | |
| 5,953,676 A | 9/1999 | Berry et al. | |
| 5,991,641 A | 11/1999 | Goni et al. | |
| 6,002,937 A | 12/1999 | Young et al. | |
| 6,029,072 A | 2/2000 | Barber | |
| 6,035,215 A | 3/2000 | Goni et al. | |
| 6,035,220 A | 3/2000 | Claudio et al. | |
| 6,049,711 A * | 4/2000 | Ben-Yehezkel et al. | .. 455/414.3 |
| 6,052,603 A * | 4/2000 | Kinzalow et al. | ........... 455/557 |
| 6,081,724 A | 6/2000 | Wilson | |
| 6,088,570 A | 7/2000 | Komara et al. | |
| 6,108,364 A | 8/2000 | Weaver et al. | |
| 6,151,510 A | 11/2000 | Zicker | |
| 6,230,008 B1 | 5/2001 | Garcia Pedraja et al. | |
| 6,243,593 B1 | 6/2001 | Zicker | |

(Continued)

FOREIGN PATENT DOCUMENTS

WO  WO 01/50618 A1  7/2001

(Continued)

OTHER PUBLICATIONS

"Cell Phone Adaptor," www.kidslake.com/cell_phone_link.htm, Mar. 24, 2002.

(Continued)

Primary Examiner—Edan Orgad
Assistant Examiner—Tu X. Nguyen

(57) ABSTRACT

A wireless signal repeater for portable wireless communication devices includes an adapter for connecting a portable wireless communication device. When a portable wireless communication device is connected to the adapter, the portable device's own omni-directional antenna is disabled, and the portable device instead uses the repeater's directional antenna. Specifically, the adapter carries forward link signals received by the repeater's directional antenna to the portable wireless communication device and carries reverse link signals from the portable wireless communication device for transmission by the repeater's directional antenna.

23 Claims, 2 Drawing Sheets

U.S. PATENT DOCUMENTS

| | | |
|---|---|---|
| 6,253,060 B1 | 6/2001 | Komara et al. |
| 6,343,220 B1 | 1/2002 | Van den Salm |
| 6,466,799 B1 | 10/2002 | Torrey et al. |
| 6,842,617 B1 | 1/2005 | Williams et al. |
| 2001/0041533 A1 | 11/2001 | Schornack et al. |
| 2002/0155860 A1 * | 10/2002 | Tordera et al. ............. 455/557 |

FOREIGN PATENT DOCUMENTS

| | | |
|---|---|---|
| WO | WO 02/058378 A2 | 7/2002 |

OTHER PUBLICATIONS

Telular Corp., Phonecell SX2i, for CDMA 800 & CDMA 1900, Jun. 18, 1999.

"KYOCERA, Quick Start Guide", 1-32, p., 2000.

"KYOCERA, Users Guide", 1-49 pg., 2000.

"QUALCOMM Data Connectivity Kit User Guide", 1-112 pg., Feb . 2000.

* cited by examiner

WIRELESS REPEATER WITH WIRELESS TELEPHONE ADAPTER

BACKGROUND

1. Field of the Invention

The present invention relates to telecommunications and, more particularly, to improvements to wireless signal repeaters.

2. Description of Related Art

Many people are increasingly using portable wireless devices for telecommunications in areas, such as residences and business, where landline telephones have traditionally been readily available. In fact, it is increasingly common for people not to subscribe to any landline telephone service at home but to rely on wireless service instead.

However, meeting the needs of customers who rely primarily on wireless service presents a number of challenges. For example, wireless coverage in buildings, such as residences, is often unreliable. To overcome this problem, wireless signal repeaters may be used. An example of such a wireless signal repeater is described in U.S. patent application Ser. No. 10/097,415, filed Mar. 14, 2002, titled "Wireless Repeater with Intelligent Signal Display," which is incorporated herein by reference.

Such wireless signal repeaters typically include a directional "donor" antenna for wirelessly communicating with a base station of a wireless telecommunications network and a "coverage" antenna for providing a wireless coverage area inside the building. The donor and coverage antennas are connected, via respective duplexers, to forward and reverse link circuits that provide amplification. In this way, the donor antenna receives forward-direction signals from the base station, the forward link circuit amplifies the forward-direction signals, and the coverage antenna transmits the forward-direction signals to the subscriber's portable wireless communications device in the building. Similarly, the coverage antenna receives reverse-direction signals from the subscriber's portable wireless communications device, the reverse link circuit amplifies the reverse-direction signals, and the donor antenna transmits the reverse-direction signals to the base station.

Although such repeaters can provide good wireless coverage within buildings, problems remain. For example, a subscriber may not want to carry his portable wireless communications device in every room of his residence, which can be a problem for a subscriber that has only wireless service at his residence. Indeed, the subscriber will typically not be carrying his wireless device with him when it is recharging. In addition, many subscribers may find it difficult to rely on wireless service exclusively because they have other devices, such as fax machines and computers, that are not equipped for wireless communications.

Accordingly, there is a need to provide a more complete solution for subscribers who wish to rely primarily or exclusively on their wireless service for telecommunications.

SUMMARY

In a first principal aspect, a preferred embodiment of the present invention provides an improved wireless signal repeater. The wireless signal repeater includes a first antenna for wirelessly communicating with a base station and a second antenna for wirelessly communicating with a portable wireless communication device. The improvement to the wireless signal repeater comprises an adapter for connecting the portable wireless communication device. When the portable wireless communication device is connected to the adapter, the adapter carriers forward link signals received by the first antenna to the portable wireless communication device and carries reverse link signals from the portable wireless communication device for transmission by the first antenna.

In a second principal aspect, a preferred embodiment of the present invention provides a wireless telecommunications system. The wireless telecommunications system comprises a first antenna for receiving forward link signals and transmitting reverse link signals, a second antenna for transmitting forward link signals and receiving reverse link signals, a forward link circuit for conducting forward link signals received by the first antenna, a reverse link circuit for conducting reverse link signals for transmission by the first antenna, and an adapter for electrically connecting a portable wireless communication device to the forward and reverse link circuits.

In a third principal aspect, a preferred embodiment of the present invention provides an improved method of using a repeater to provide wireless communications between a portable wireless communication device and a base station of a wireless telecommunications network. The repeater includes a first antenna for wirelessly communicating with the base station and a second antenna for wirelessly communicating with the portable wireless communication device. In accordance with the improved method, the portable wireless communication device is electrically connected to the repeater, reverse link signals are conducted from the portable wireless communication device to the first antenna, and the first antenna transmits the reverse link signals to the base station.

DETAILED DESCRIPTION OF EXEMPLARY EMBODIMENTS

1. Exemplary Wireless Telecommunications System

Figure 1:
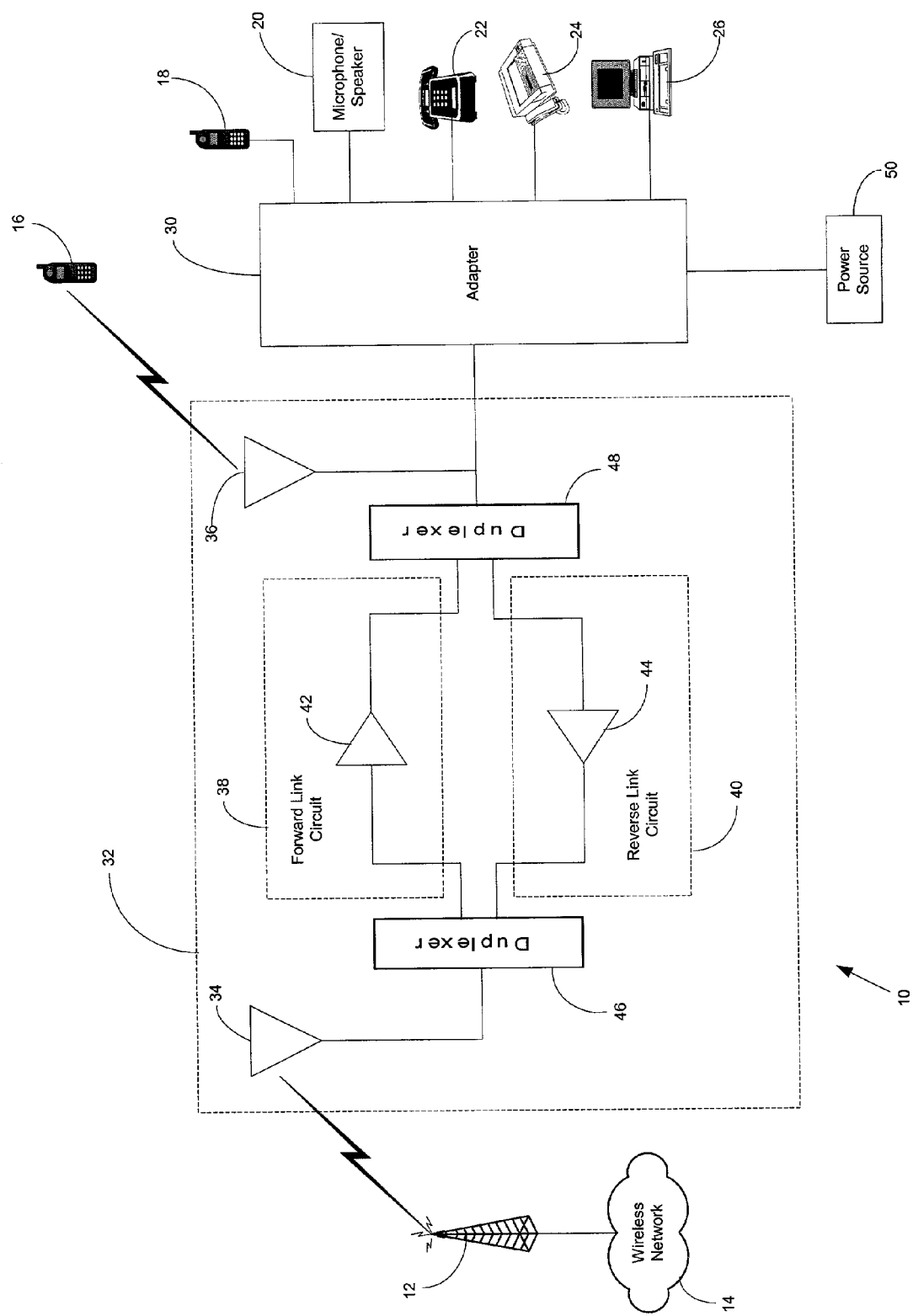
FIG. 1 is a simplified block diagram of a wireless telecommunications system, in accordance with an exemplary embodiment of the present invention.

Referring to the drawings, FIG. 1 is a simplified block diagram of an exemplary wireless telecommunications system 10. Wireless telecommunications system 10 provides wireless communications between a base station 12 of a wireless telecommunications network 14 and one or more user communication devices. Such user communication devices may include portable wireless communication devices, such as wireless telephones 16 and 18, wireless personal digital assistants (not shown), or other portable devices equipped for wireless communication. Such user communication devices may also include audio communication systems, such as an external microphone/speaker 20, telephony devices not already equipped for wireless communication, such as a landline telephone 22, a facsimile machine 24, or a modem (not shown), and data handling devices, such as a desktop computer 26, notebook computer (not shown), handheld computer (not shown), or printer (not shown).

Wireless telecommunication system 10 is able to wirelessly communicate with user communication devices, such as wireless telephone 16, by acting as a wireless signal repeater. The repeater functionality of wireless telecommunication system 10 may be used to improve wireless signal quality in areas, such as buildings, where the quality of wireless communications with wireless network 14 may be reduced. To achieve this, wireless telecommunications 10 system typically receives, boosts, and re-transmits wireless signals.

Wireless telecommunications system 10 is also able to communicate with one or more user communication devices, such as wireless telephone 18, via an adapter 30. Although FIG. 1 shows wireless telephone 18 connected to adapter 30, it is to be understood that wireless telephone 18 may also be disconnected from adapter 30 and communicate wirelessly like wireless telephone 16 shown in FIG. 1.

As described in more detail below, adapter 30 may allow a subscriber to use his wireless service without having to carry his portable wireless communication device with him. For example, the user may use wireless telephone 18, connected to adapter 30, as a speakerphone by means of an audio communication system, such as an external microphone/speaker. The user may also use telephony devices or data handling devices remotely connected to adapter 30 to make send and receive calls through wireless telephone 18 connected to adapter 30. Adapter 30 may also recharge wireless telephone 18 when connected. Using wireless telephone 18 with adapter 30 may also beneficially reduce radio frequency (RF) interference in areas served by wireless network 14.

The components that provide wireless telecommunications system 10 with wireless repeater functionality are shown in FIG. 1 as a repeater block 32. Repeater block 32 includes a donor antenna 34 for wirelessly communicating with base station 12, and a coverage antenna 36 for wirelessly communicating with portable wireless communication devices, such as wireless telephone 16. More particularly, donor antenna 34 receives forward link signals transmitted by base station 12 and transmits reverse link signals to base station 12. Coverage antenna 36 transmits forward link signals to and receives reverse link signals from portable wireless communication devices, such as wireless telephone 16. Donor antenna 34 is preferably a directional antenna with a 30 to 45 degree beam width.

Repeater block 32 may separately process forward link signals in a forward link circuit 38 and reverse link signals in a reverse link circuit 40. Forward link circuit 38 may include one or more amplifiers 42 for boosting forward link signals, and reverse link circuit 40 may include one or more amplifiers 44 for boosting reverse link signals. Circuits 38 and 40 may be connected to donor antenna 34 via a duplexer 46 and to coverage antenna 36 via a duplexer 48. Repeater block 32 may also include other components, such as a display that indicates signal strength. Further details regarding an exemplary configuration for repeater block 32 are described in U.S. patent application Ser. No. 10/097,415, which has been incorporated by reference.

Repeater block 32 preferably operates as follows. Donor antenna 34 receives forward link signals from base station 12 over an air interface. The forward link signals then pass through duplexer 46 to forward link circuit 38, where they are amplified. Forward link circuit 38 conducts the amplified forward link signals to coverage antenna 36, via duplexer 48. Coverage antenna 36 re-transmits the forward link signals over an air interface to portable wireless communication devices in its wireless coverage area, such as wireless telephone 16. Coverage antenna 36 also receives reverse link signals over an air interface from portable wireless communication devices, such as wireless telephone 16, that are located in its wireless coverage area. The reverse link signals then pass through duplexer 48 to reverse link circuit 40, where they are amplified. Reverse link circuit 40 then conducts the reverse link signals to donor antenna 34, via duplexer 46. Donor antenna 34 re-transmits the reverse link signals to base station 12.

Wireless telecommunications system 10 also includes an adapter 30 that allows a portable wireless communication device (which will be taken to be wireless telephone 18, for purposes of illustration), to be communicatively coupled to repeater block 32 without the use of coverage antenna 36. More particularly, adapter 30 is connected to a signal path in repeater block 32 such that, when wireless telephone 18 is coupled to adapter 30, forward link signals received by donor antenna 34 are able to pass to wireless telephone 18 and reverse link signals from wireless telephone 18 are able to pass to donor antenna 34 for transmission. In contrast to the use of donor antenna 34 to send signals to and receive signals wireless telephone 18, adapter 30 passes signals to and from wireless telephone 18 by electrical conduction, or by optical or inductive coupling.

In a preferred embodiment, adapter 30 is connected to the signal path between duplexer 48 and coverage antenna 36, as shown in FIG. 1. Alternatively, adapter 30 may be connected to signals paths on the other side of duplexer 48, e.g., to forward link circuit 38 and reverse link circuit 40, or adapter 30 may be coupled to donor antenna 34 in some other fashion. The connection between adapter 30 and repeater block 32 may be made by a direct electrical connection, or the connection may be made via one or more transformers, switches, or other devices.

As described in more detail below, the physical and electrical configuration of adapter 30 may depend on the specific model of portable wireless communication device to be coupled to it. Accordingly, adapter 30 is preferably removably connected to repeater block 32, so that different configurations of adapter 30 may be connected depending on what model of portable wireless communication device is to be coupled to repeater block 32. Adapter 30 may be removably connected by joining it directly to a connector (not shown) mounted on the housing of repeater block 32. Alternatively, adapter 30 may be placed in a location removed from repeater block 32 by connecting it to repeater block 32 via an electrical or optical cable. As yet another alternative, adapter 30 may not be removable but may be formed into the housing of repeater block 32.

As described in more detail below, other user communication devices may be connected to adapter 30. Such user communication devices may include audio communication devices, such as microphone/speaker 20, telephony devices, such as telephone 22 and fax machine 24, and data handling devices, such as computer 26.

Adapter 30 may also be powered by a power source 50. Power source 50 may be an AC power source, such as a standard wall outlet, or a DC power source, such as an AC adapter, or one or more batteries. Power source 50 may also supply power to repeater block 32, or it may separately power adapter 30.

Figure 2:
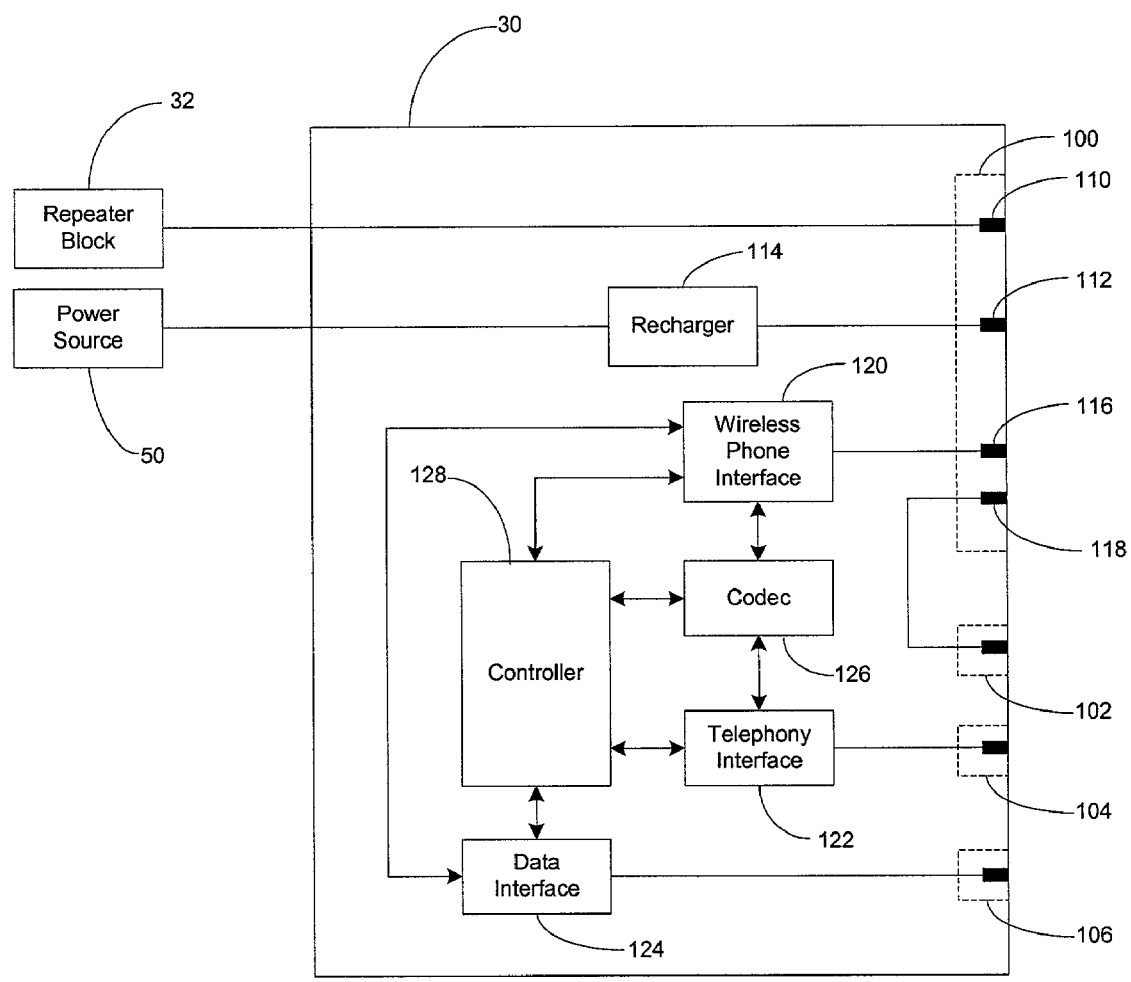
FIG. 2 is a more detailed block diagram of the adapter of FIG. 1, in accordance with an exemplary embodiment of the present invention.

FIG. 2 is a more detailed block diagram of an exemplary adapter 30. Adapter 30 includes a connector 100 for connecting a portable wireless communication device (wireless telephone 18 in this illustrative example). For example, adapter 30 may be configured as a cradle to better position wireless telephone 18 for connection to connector 100.

Adapter 30 may also include connectors for connecting other communication devices. For example, adapter 30 may include one or more audio connectors 102 for connecting audio communication systems, such as external microphone/speaker 20. Adapter 30 may also include one or more telephony connectors 104, such as RJ-11 or RJ-45 connectors, for connecting telephony devices, such as landline telephone 22 and fax machine 24. Adapter 30 may also include one or more data connectors 106, such as serial or parallel connectors, for connecting data handling devices, such as computer 26. Adapter 30 may also include other types of connectors for connecting other types of devices. Alternatively, instead of using connectors, one or more of the foregoing devices, such as an external microphone/speaker maybe "hard wired" or built into adapter 30.

Connector 100 communicatively couples wireless telephone 18 to repeater block 32 and, optionally, to other systems. Connector 100 may include one or more electrical contacts to provide this coupling to wireless telephone 18, such as by electrically connecting to corresponding electrical contacts in wireless telephone 18. The electrical connection may be made directly, i.e., by direct physical contact, or it may be made indirectly, such as via a cable.

The number, type, and arrangement of electrical contacts in connector 100 will, in general, depend on the model of wireless telephone 18 connected to it. In an exemplary embodiment, connector 100 includes one or more signal contacts 110 for conducting forward link signals from repeater block 32 to wireless telephone 18 and for conducting reverse link signals from wireless telephone 18 to repeater block 32. The forward and reverse link signals may be radio frequency (RF) signals and, more particularly, may be at the frequency at which they are wirelessly transmitted. Many wireless telephone models, such as the Kyocera/Qualcomm QCP-2760, have a connector for connecting to an external antenna that may be connected to signal contacts 110 for this purpose. Moreover, connecting to a wireless telephone's external antenna connector will typically disable the wireless telephone's antenna. Thus, as described in more detail below, when the external antenna connector of wireless telephone 18 is connected to signal contacts 110, wireless telephone 18 uses repeater 32, rather than its own antenna, to send and receive wireless signals.

Connector 100 may also include one or more recharger contacts 112 for recharging wireless telephone 18 when it is connected to adapter 30. Specifically, recharger contacts 112 electrically connect with corresponding recharger contacts on wireless telephone 18. Recharger contacts 112 may be connected to a recharger 114 included in adapter 30 and powered by power source 50. Alternatively, recharger contacts 112 may be connected to an external recharger.

Connector 100 may also include one or more input/output contacts 116 that, when connected to wireless telephone 18, allow calls to be made remotely through wireless telephone 18. Many wireless telephone models, such as the Kyocera/Qualcomm QCP-2760, have contacts that may be connected to input/output contacts 116 for this purpose. Such contacts allow wireless telephone 18 to be controlled by another device to send and receive calls and to have the voice, data, or other media of the call come from or be received by another device. Thus, by using input/output contacts 116, other communication devices connected to adapter 30, such as telephony devices connected to telephony connector 104 or data handling devices connected to data connector 106, may use wireless telephone 18, to send and receive calls.

Adapter 30 may include other components to enable calls to be made through wireless telephone 18. For example, input/output contacts 116 may be connected to a wireless phone interface 120, telephony connector 104 may be connected to a telephony interface 122, and data connector 106 may be connected to a data interface 124.

Wireless phone interface 120 transmits signals to and receives signals from wireless phone 18. Such signals may include control signals for controlling the operation of wireless telephone 18 and may include the voice, data, or other media of the call, typically in a digital format.

Telephony interface 122 transmits audio to and receives audio from the telephony device connected to telephony connector 104. Telephony interface 122 may also include circuitry to detect whether the telephony device connected to connector 104 is on-hook or off-hook, a switch tone generator, for generating dial tones, ring tones, and busy signals for the telephony device, a DTMF detector for detecting and decoding DTMF tones from the telephony device, and a ringer for ringing the telephony device. Telephony interface 122 may be connected to wireless phone interface 120 via a codec 126. Codec 126 converts between the analog audio format used by the telephony device connected to connector 104 and the digital audio format used by wireless telephone 18. In this way, telephony connector 104, telephony interface 122, codec 126, wireless phone interface 120, and input/output contacts 116 may be used to provide an audio pathway between wireless phone 18 and a telephony device connected to connector 104, such as landline telephone 22 or fax machine 24.

Data interface 124 transmits data to and receives data from the data handling device connected to data connector 106. Data interface 124 may also be connected to wireless phone interface 120, so that data connector 106, data interface 124, wireless phone interface 120, and input/output contacts 116 may be used to provide a data pathway between wireless phone 18 and a data handling device connected to data connector 106, such as computer 26.

Adapter 30 may also include a controller 128 that controls the operation of wireless phone interface 120, telephony interface 122, data interface 124, and codec 126 in a manner described in more detail below. Controller 128 may include a microprocessor and memory with stored machine instructions.

Connector 100 may also include one or more audio contacts 118 that connect to the connector present in most wireless telephone models for connecting an external microphone/speaker. This external microphone/speaker connector is normally used to connect an external microphone and speaker, usually provided as a microphone/speaker unit, to allow for convenient "hands free" operation of the wireless telephone. The external microphone/speaker may also have a voice activated dialing capability. As shown in FIG. 2, audio contacts 118 are connected to audio connector 102 in adapter 30. Thus, the external microphone/speaker or other audio communication system that is normally connected to wireless telephone 18 directly may instead be connected to audio connector 102 and used in the same way as if directly connected to wireless telephone 18. In this way, external microphone/speaker 20 may be left connected to adapter 30 ready for use, independently of when wireless telephone 18 is connected to adapter 30, and the user may be able to use wireless telephone 18 "hands free" when it is connected to adapter 30.

Although in the examples described above, connector 100 includes electrical contacts for coupling to wireless telephone 18, connector 100 may also couple signals to wireless telephone 18 by using optical connectors, inductive couplers, or other such means.

2. Exemplary Operation

The exemplary embodiment shown in FIGS. 1 and 2 and described above may operate as follows. When wireless telephone 18 is within the coverage area of coverage antenna 36 but not connected to adapter 30, wireless telecommunications system 10 functions as a repeater. Specifically, in preferred embodiments, wireless telecommunications system 10 amplifies forward link signals from base station 12 and re-transmits them to wireless telephone 18, and it amplifies reverse link signals from wireless telephone 18 and re-transmits them to base station 12. In this way, wireless telecommunications system 10 may improve wireless reception within the coverage area of coverage antenna 36. Of course, wireless telephone 18 will also typically be able to wirelessly communicate with wireless network 14 when it is not within the coverage area of coverage antenna 36, provided it is within the coverage area of base station 12 or other base station.

The user may also connect wireless telephone 18 to adapter 30 of wireless telecommunications system 10, as shown in FIG. 1. When so connected, wireless telephone 18 is still able to send and receive calls because adapter 30 carries forward link signals received by donor antenna 34 to wireless telephone 18 and carries reverse link signals from wireless telephone 18 for transmission by donor antenna 34. In fact, the antenna of wireless telephone 18 is preferably disabled when wireless telephone 18 is connected to adapter 30. Instead, wireless telephone 18 uses donor antenna 34 for wireless communication with base station 12. Because the antenna of wireless telephone 18 is typically omni-directional, whereas donor antenna 34 is typically highly directional, using wireless telephone 18 connected to adapter 30 may advantageously reduce RF interference within wireless network 14.

Wireless telephone 18 may be used in different ways when it is connected to adapter 30. For example, the user may simply use the buttons, microphone, and speaker already provided on wireless telephone 18 to send and receive calls. More conveniently, the user may use an external audio communication system, such as microphone/speaker 20, connected to adapter 30 as described above Such an external audio communication system may allow wireless telephone 18, when connected to adapter 30, to be used as a speakerphone. This approach is particularly convenient if the external audio communication system also includes a voice activated dialing feature. Alternatively, in some embodiments the user may connect an external audio communication system to wireless telephone 18 directly, rather than to adapter 30.

To use wireless telephone 18 as a speakerphone, one may need to be located nearby, such as in the same room. However, in the exemplary embodiment of FIGS. 1 and 2, a user may also connect adapter 30 to a telephony device, such as landline telephone 22, which may be located in a different room. In this way, the user may be able to use wireless telephone 18, when connected to adapter 30, to send and receive calls, even when the user is located in a different room.

To use a telephony device, such as landline telephone 22, connected to connector 104, to make a call through wireless telephone 18, adapter 30 may operate as follows. When telephone 22 goes off-hook to make a call, telephony interface 122 may detect the off-hook condition and alert controller 128. Controller 128 may then signal telephony interface 122 to generate a dial tone for telephone 22. Upon hearing the dial tone, the user may use telephone 22 to dial the digits of the called number, so that telephone 22 generates pulses or DTMF tones corresponding to the dialed digits. Telephony interface 122 evaluates the dialed digits and forwards the dialed digit information to controller 128. Once controller 128 collects all the dialed digits, controller 128 forwards them to wireless telephone 18, via wireless phone interface 120 and contacts 116, and causes wireless telephone 18 to originate a call to the called number.

In response, wireless telephone 18 generates a call origination request. The call origination request identifies the called party, such as by including the dialed digits. The call origination request also identifies wireless telephone 18 as the caller, such as by including the mobile identification number (MIN) and electronic serial number (ESN) of wireless telephone 18. The call origination request passes into adapter 30 via contacts 110, and adapter 30 conducts it, as a reverse link signal, to repeater block 32. Donor antenna 34 transmits the call origination request to base station 12. Wireless network 14 processes the call origination request based on the dialed digits and the MIN included therein. Thus, wireless network 14 routes the call to the called party and treats the call as having been made by wireless telephone 18, even though the user used landline telephone 22 to dial the digits. Once the call is connected to the called party, controller 128 controls wireless phone interface 120, codec 126, and telephony interface 122 to set up an audio pathway between wireless telephone 18 and telephone 22. In this way, the user is able to operate a landline telephony device connected to adapter 30 to use his wireless service, including enhanced call services that he may subscribe to, such as call waiting and three-way calling.

The user is also able to use landline telephone 22 to receive calls through wireless telephone 28 in the following way. Wireless network 14 receives a request to terminate a call to a directory number corresponding to wireless telephone 18, and base station 12 transmits the call termination request, e.g., as a page signal. Donor antenna 34 receives the page signal, and repeater block 32 conducts the page signal, as a forward link signal, to adapter 30. Adapter 30, in turn, conducts the page signal to wireless telephone 18, via signal contacts 110. In response, wireless telephone 18 signals controller 128, via wireless phone interface 120, that it has received a page. Wireless telephone 18 also generates a page response signal, which adapter 30 conducts to repeater block 32 as a reverse link signal and donor antenna 34 transmits to base station 12. Wireless network 14 may, in response, cause base station 12 to transmit an alert signal. Repeater block 32 and adapter 30 conducts the alert signal, as a forward link signal, to wireless telephone 18. When wireless telephone 18 receives the alert signal, it rings, and also signals controller 128 that it has received an alert signal. Controller 128 responsively signals telephony interface 122 to ring landline telephone 22 connected to connector 104. When the user answers landline telephone 22 and the call is connected, controller 128 controls wireless phone interface 120, codec 126, and telephony interface 122 to set up an audio pathway between wireless telephone 18 and telephone 22.

In an exemplary embodiment, adapter 30 may also enable a user to use an external data handling device, such as computer 26, connected to connector 104 to engage in wireless data sessions through wireless telephone 18. In particular, controller 128 may control wireless phone interface 120 and data interface 124, so as to set up a data pathway between wireless telephone 18 and the data handling device connected to connector 106.

It is to be noted that even when adapter 30 is used to conduct forward link signals to and reverse link signals from wireless telephone 18, coverage antenna 36 is preferably still operational. Thus, while wireless telephone 18 is connected to adapter 30, other portable wireless communication devices, such as wireless telephone 16, may still wirelessly communicate with coverage antenna 36.

3. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A system comprising:
    a wireless signal repeater having a first antenna for wirelessly communicating with a base station and a second antenna for wirelessly communicating with a portable wireless communication device; and
    an adapter for connecting said portable wireless communication device, said adapter carrying forward link signals received by said first antenna to said portable wireless communication device and carrying reverse link signals from said portable wireless communication device for transmission by said first antenna when said portable wireless communication device is connected to said adapter, wherein said adapter includes an interface for interfacing at least one other communication device with said portable wireless communication device to allow said at least one other communication device to send and receive calls through said portable wireless communication device when said at least one other communication device and said portable wireless communication device are connected to said adapter.

2. The system of claim 1, wherein said adapter carries said forward link signals to said portable wireless communication device and carries said reverse link signals from said portable wireless communication device by an electrical connection.

3. The system of claim 1, wherein said adapter carries said forward link signals to said portable wireless communication device and carries said reverse link signals from said portable wireless communication device by optical coupling.

4. The system of claim 1, wherein said adapter carries said forward link signals to said portable wireless communication device and carries said reverse link signals from said portable wireless communication device by inductive coupling.

5. The system of claim 1, wherein said at least one other communication device includes an audio communication system.

6. The system of claim 1, wherein said at least one other communication device includes a telephony device.

7. The system of claim 1, wherein said at least one other communication device includes a data handling device.

8. The system of claim 1, wherein said adapter includes a recharger for recharging said portable wireless communication device.

9. The system of claim 1, wherein said first antenna is a directional antenna.

10. A wireless telecommunications system, comprising:
    a first antenna for receiving forward link signals and transmitting reverse link signals;
    a second antenna for wirelessly transmitting said forward link signals to a portable wireless communication device and wirelessly receiving said reverse link signals from said portable wireless communication device;
    a forward link circuit for conducting said forward link signals received by said first antenna;
    a reverse link circuit for conducting said reverse link signals for transmission by said first antenna; and
    an adapter for connecting said portable wireless communication device, said adapter communicatively coupling said portable wireless communication device to said forward link circuit and said reverse link circuit, wherein said adapter includes an interface for interfacing at least one other communication device with said portable wireless communication device to allow said at least one other communication device to send and receive calls through said portable wireless communication device when said at least one other communication device and said portable wireless communication device are connected to said adapter.

11. The wireless telecommunications system of claim 10, wherein said adapter includes an electrical connector for communicatively coupling said portable wireless communication device to said forward link circuit and said reverse link circuit.

12. The system of claim 1, wherein said adapter is removably connected to said wireless signal repeater.

13. The system of claim 1, wherein said adapter is formed into a housing of said wireless signal repeater.

14. The wireless telecommunications system of claim 10, wherein said adapter includes an optical coupler for communicatively coupling said portable wireless communication device to said forward link circuit and said reverse link circuit.

15. The wireless telecommunications system of claim 10, wherein said adapter includes an inductive coupler for communicatively coupling said portable wireless communication device to said forward link circuit and said reverse link circuit.

16. The wireless telecommunications system of claim 10, wherein said at least one other communication device includes an audio communication system.

17. The wireless telecommunications system of claim 10, wherein said at least one other communication device includes a telephony device.

18. The wireless telecommunications system of claim 10, wherein said at least one other communication device includes a data handling device.

19. The wireless telecommunications system of claim 10, wherein said adapter includes a recharger for recharging said portable wireless communication device.

20. The wireless telecommunications system of claim 10, wherein said first antenna is a directional antenna.

21. A method of using a repeater to provide wireless communication between a portable wireless communication device and a base station of a wireless telecommunications network, said repeater including a first antenna for wirelessly communicating with said base station and a second antenna for wirelessly communicating with said portable wireless communication device, said method comprising:
    said first antenna receiving forward link signals from said base station;
    said first antenna transmitting reverse link signals to said base station;
    electrically connecting said portable wireless communication device to said repeater via an external antenna connector of said portable wireless communication device and, when said portable wireless communication device is electrically connected to said repeater:
  (a) conducting said forward link signals from said first antenna to said portable wireless communication device; and
  (b) conducting said reverse link signals from said portable wireless communication device to said first antenna; and
when said portable wireless communication device is disconnected from said repeater:
  (c) said second antenna transmitting said forward link signals over an air interface to said portable wireless communication device; and
  (d) said second antenna receiving said reverse link signals over an air interface from said portable wireless communication device.

22. The method of claim 21, further comprising, when said portable wireless communication device is electrically connected to said repeater:
  electrically connecting at least one other communication device to said repeater;
  dialing digits using said at least one other communication device;
  conducting a signal including said dialed digits to said portable wireless communication device;
  said portable wireless communication device generating a call origination request, said call origination request including said dialed digits and an identification of said portable wireless communication device;
  conducting said call origination request from said portable wireless communication device to said first antenna;
  said first antenna transmitting said call origination request to said base station over an air interface; and
  said wireless telecommunications network processing said call origination request based on said dialed digits and said identification.

23. The method of claim 21, further comprising, when said portable wireless communication device is electrically connected to said repeater:
  electrically connecting at least one other communication device to said repeater;
  said base station transmitting a call termination request to said first antenna over an air interface;
  conducting said call termination request from said first antenna to said portable wireless communication device;
  said portable wireless communication device generating a call termination response in response to said call termination request;
  conducting said call termination response from said portable wireless communication device to said first antenna;
  said first antenna transmitting said call termination response to said base station over an air interface; and
  ringing said at least one other communication device, in response to said call termination request.

* * * * *